United States Patent
Aguera et al.

(10) Patent No.: US 12,077,274 B2
(45) Date of Patent: Sep. 3, 2024

(54) AIRCRAFT COMPRISING AT LEAST ONE SYSTEMS CABINET CONNECTED TO A LANDING GEAR COMPARTMENT BY AT LEAST ONE SLIDING CONNECTION SLIDING IN A LONGITUDINAL DIRECTION

(71) Applicant: Airbus Operations SAS, Toulouse (FR)

(72) Inventors: Damien Aguera, Toulouse (FR); Salim Chalqi, Toulouse (FR); Yannick Lampure, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/185,590

(22) Filed: Mar. 17, 2023

(65) Prior Publication Data
US 2023/0303236 A1    Sep. 28, 2023

(30) Foreign Application Priority Data
Mar. 24, 2022 (FR) ...................................... 2202600

(51) Int. Cl.
*B64C 1/06*        (2006.01)
*B64D 43/00*       (2006.01)

(52) U.S. Cl.
CPC .............. *B64C 1/068* (2013.01); *B64D 43/00* (2013.01)

(58) Field of Classification Search
CPC .......... B64C 1/18; B64C 1/068; B64C 1/0683
See application file for complete search history.

(56) References Cited

U.S. PATENT DOCUMENTS

| | | | |
|---|---|---|---|
| 4,153,225 A | 5/1979 | Paulsen | |
| 8,544,789 B2* | 10/2013 | Gallant | F16F 1/38 244/38 |
| 8,915,470 B2* | 12/2014 | Bernadet | B64D 11/00 244/119 |
| 9,216,809 B2* | 12/2015 | Guering | B64D 13/00 |
| 9,290,259 B2* | 3/2016 | Durand | B64D 43/00 |
| 9,351,412 B2* | 5/2016 | Durand | B64D 43/00 |
| 9,359,084 B2* | 6/2016 | Durand | B64D 43/00 |
| 9,764,816 B2* | 9/2017 | Dazet | B64C 1/069 |
| 9,878,790 B2* | 1/2018 | Burgunder | B64C 9/24 |
| 10,046,845 B2* | 8/2018 | Dazet | B64C 1/062 |

(Continued)

FOREIGN PATENT DOCUMENTS

FR    2917377 A1    12/2008

OTHER PUBLICATIONS

French Search Report for French Patent Application No. 2202600 dated Oct. 13, 2022; priority document.

*Primary Examiner* — Joshua J Michener
*Assistant Examiner* — Michael B. Kreiner
(74) *Attorney, Agent, or Firm* — Greer, Burns & Crain, Ltd.

(57) ABSTRACT

An aircraft having a systems cabinet positioned in an avionics bay to the rear of a landing gear compartment and connected to the fuselage by at least one lower connecting system. The systems cabinet and/or the lower connecting system comprises at least one longitudinal beam, which has a front end connected by a front connection to a wall separating the avionics bay and the landing gear compartment, the front connection comprising a sliding connection sliding in a direction substantially parallel to the longitudinal axis.

12 Claims, 5 Drawing Sheets

(56) References Cited

U.S. PATENT DOCUMENTS

| | | |
|---|---|---|
| 11,279,470 B2 * | 3/2022 | Murray .................. B64C 1/061 |
| 11,293,465 B2 * | 4/2022 | Brindeau .................. B64C 1/18 |
| 11,352,119 B2 * | 6/2022 | Guering .................... B64F 5/10 |
| 11,377,230 B2 * | 7/2022 | Saint-Marc ............ B64D 43/00 |
| 2010/0187355 A1 | 7/2010 | Guering et al. |
| 2011/0127379 A1 * | 6/2011 | Jager ......................... B64C 1/18 |
| | | 244/118.1 |
| 2014/0175225 A1 * | 6/2014 | Durand ................. B64D 11/00 |
| | | 244/129.6 |
| 2014/0175226 A1 | 6/2014 | Durand et al. |
| 2019/0185130 A1 | 6/2019 | Guering et al. |

\* cited by examiner

AIRCRAFT COMPRISING AT LEAST ONE SYSTEMS CABINET CONNECTED TO A LANDING GEAR COMPARTMENT BY AT LEAST ONE SLIDING CONNECTION SLIDING IN A LONGITUDINAL DIRECTION

CROSS-REFERENCES TO RELATED APPLICATIONS

This application claims the benefit of French Patent Application No. 2202600 filed on Mar. 24, 2022, the entire disclosure of which is incorporated herein by way of reference.

FIELD OF INVENTION

The present application relates to an aircraft comprising at least one systems cabinet connected to a landing gear compartment by at least one sliding connection sliding in a longitudinal direction.

BACKGROUND OF INVENTION

According to one embodiment visible in FIGS. 1 and 2, an aircraft comprises a fuselage 10 and a floor 12 which splits the interior of the fuselage 10 into an upper zone 14 and a lower zone 16. In one configuration, the floor 12 comprises transverse beams 18 positioned in transverse planes perpendicular to the longitudinal axis X of the aircraft. The fuselage 10 comprises a primary structure to which the skin of the fuselage 10 is attached. The primary structure comprises a plurality of frames 10.1 positioned in transverse planes.

The aircraft comprises a landing gear compartment situated at the front of the lower zone of a nosecone, underneath the flight deck, and an avionics bay 22 in which a plurality of systems cabinets 20 are positioned. In one arrangement, the systems cabinets 20 are arranged in two rows, one on each side of the longitudinal axis X, so as to delimit a passageway 24.

In one embodiment visible in FIG. 2, each systems cabinet 20 comprises a substantially vertical front face F20, parallel to the longitudinal axis X and oriented toward said longitudinal axis X, a substantially vertical rear face F20', parallel to the longitudinal axis X and on the opposite side to the front face F20, as well as vertical uprights positioned on the front and rear faces F20, F20' and distributed along the length of the systems cabinet 20, uprights being situated at each longitudinal end of the front and rear faces F20, F20'. By substantially, it is meant that at least 90%, or 95%, or 99% is the same.

Each systems cabinet 20 is connected to the primary structure of the fuselage 10 by front lower connecting systems 26.1 and rear lower connecting systems 26.2 and to the transverse beams 18 of the floor 12 by upper connecting systems 28.

Each upper connecting system 28 comprises a link 30 which has a first end 30.1 connected by a ball-jointed first articulation to the systems cabinet 20, more particularly to an upright of the systems cabinet 20, and a second end 30.2 connected by a ball-jointed second articulation to one of the transverse beams 18 of the floor 12, the link 30 and the transverse beam 18 being positioned substantially in the one same transverse plane in order to optimize the reaction of forces.

Each front lower connecting system 26.1 is positioned at the front face F20 of the systems cabinet 20 and comprises a link 32 which has a first end 32.1 connected by a ball-jointed first articulation to the systems cabinet 20, more particularly to an upright of the systems cabinet 20, and a second end 32.2 connected by a ball-jointed second articulation to the structure of the fuselage 10 and more particularly to a frame 10.1 of the primary structure of the fuselage 10.

Each rear lower connecting system 26.2 is positioned at the rear face F20' of the cabinet 20 and comprises a yoke 34, secured to the systems cabinet 20 and more particularly to an upright of the systems cabinet 20, said fastener being connected by a ball-jointed spindle to a fastener secured to a frame 10.1 of the primary structure of the fuselage 10.

The landing gear compartment is demarcated by walls and configured to house a landing gear able to move between down and retracted positions. Even if the walls of the landing gear compartment are reinforced, the movements of retracting and lowering the landing gear cause the walls of the landing gear compartment to deform.

Given these deformations, it is difficult to connect a systems cabinet 20 to the landing gear compartment.

Thus, the systems cabinets 20 can be connected at their lower part only to the frames 10.1 of the fuselage. Because they cannot be connected to the landing gear compartment on account of the deformations of the latter, the systems cabinets 20 are distanced therefrom, which means that their installation in the avionics bay cannot be optimized.

The present invention seeks to overcome all or some of the disadvantages of the prior art.

SUMMARY OF THE INVENTION

The subject of the invention is to provide an aircraft comprising a fuselage which has a longitudinal axis and a structure, a floor demarcating an upper zone above the floor and a lower zone beneath the floor, an avionics bay situated in the lower zone, a landing gear compartment situated in the lower zone, in front of the avionics bay, and separated from the avionics bay by at least one wall, at least one systems cabinet positioned in the avionics bay and at least one lower connecting system connecting the systems cabinet and the structure of the fuselage.

According to the invention, the systems cabinet and/or the lower connecting system comprises at least one longitudinal beam, oriented parallel to the longitudinal axis, which has a front end oriented toward the landing gear compartment and connected by a front connection to the wall separating the avionics bay and the landing gear compartment, the front connection comprising a sliding connection sliding in a direction substantially parallel to the longitudinal axis.

Thus, the front connection does not transmit to the systems cabinet the deformations, in the longitudinal direction, of the wall separating the avionics bay from the landing gear compartment. Insofar as this cabinet can be connected to the landing gear compartment, it can be shifted further toward the front of the avionics bay, so that its installation can be optimized.

According to another feature, the front connection comprises a longitudinal rod, oriented parallel to the longitudinal axis, having a first end connected to a first element of either the wall or the longitudinal beam and a housing configured to house the longitudinal rod and positioned on a second element, different than the first element, of either the longitudinal beam or the wall.

According to another feature, the front connection is ball-jointed.

According to another feature, the front connection comprises:

a first ring having an interior surface of inside diameter substantially equal to the outside diameter of the longitudinal rod so as to obtain the sliding connection between the longitudinal rod and the first ring, and a substantially spherical exterior surface, a second ring, positioned around the first ring, having a substantially spherical interior surface matched to the exterior surface of the first ring so as to form a ball-jointed connection, and an exterior surface that is built into the housing.

According to another feature, the longitudinal rod is connected to the wall.

According to a first embodiment, the longitudinal beam is hollow and comprises, at its front end, a transverse wall which has a through-hole forming the housing.

According to another embodiment, the front connection comprises a hollow segment with a square or rectangular cross section, said hollow segment being connected to the transverse beam and comprising a transverse wall which has a through-hole forming the housing.

According to another feature, the systems cabinet comprises a front face and first vertical uprights each comprising a first face positioned at the front face, the longitudinal beam being positioned plumb with the first uprights and connected to the structure of the fuselage.

According to another feature, the longitudinal beam has an upper flange on which the systems cabinet rests, and a web substantially perpendicular to the upper flange. In addition to this, the lower connecting system comprises, for each first upright, a first bracket having a first arm pressed intimately against the first face of the first upright and connected to said first upright by at least one fixing and a second arm pressed intimately against the upper flange of the longitudinal beam and connected to said upper flange by at least one fixing.

According to another feature, the lower connecting system comprises, in line with at least one first upright, a second bracket, positioned in line with the first bracket, having a first arm pressed intimately against the web of the longitudinal beam and connected to the web by at least one fixing and a second arm pressed intimately against the upper flange of the longitudinal beam and connected to this upper flange by at least one fixing.

According to another feature, the second arms of the first and second brackets and the upper flange of the longitudinal beam are connected using the same fixings.

According to another feature, the lower connection comprises at least one link, positioned in a vertical plane parallel to the longitudinal axis, which has a first end connected to the transverse beam and/or to the systems cabinet, and a second end connected to the structure of the fuselage and/or to a junction zone connecting the structure of the fuselage and the wall of the landing gear compartment.

BRIEF DESCRIPTION OF THE DRAWINGS

Further features and advantages will become apparent from the description of the invention that is to follow, which description is given solely by way of example, with reference to the attached drawings among which.

DETAILED DESCRIPTION OF THE PREFERRED EMBODIMENTS

Figure 1:
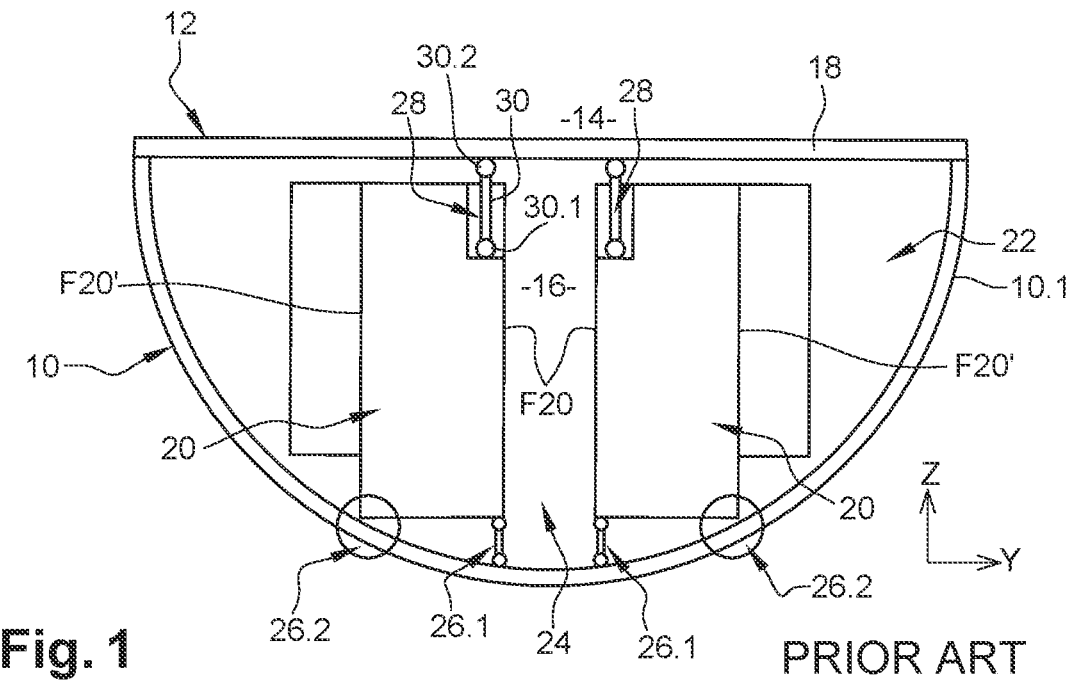
FIG. 1 is a schematic face-on view of an avionics bay illustrating an embodiment of the prior art.
Figure 2:
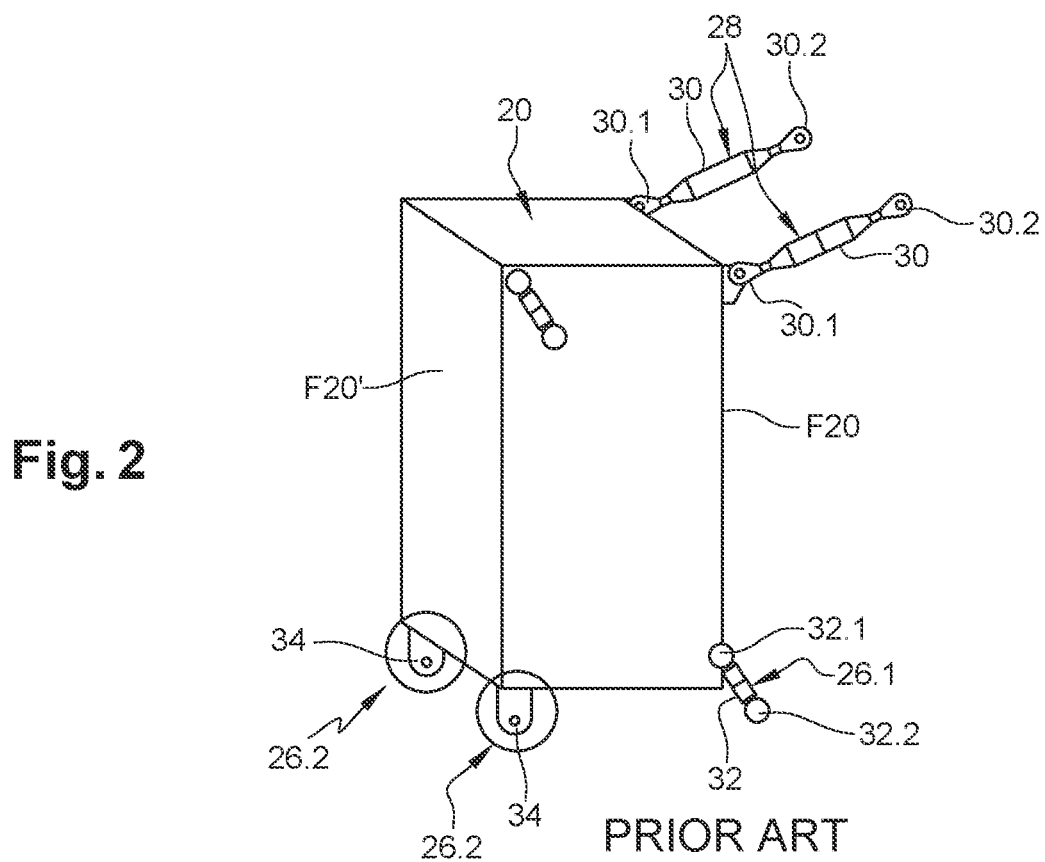
FIG. 2 is a perspective view of a systems cabinet illustrating an embodiment of the prior art.
Figure 3:
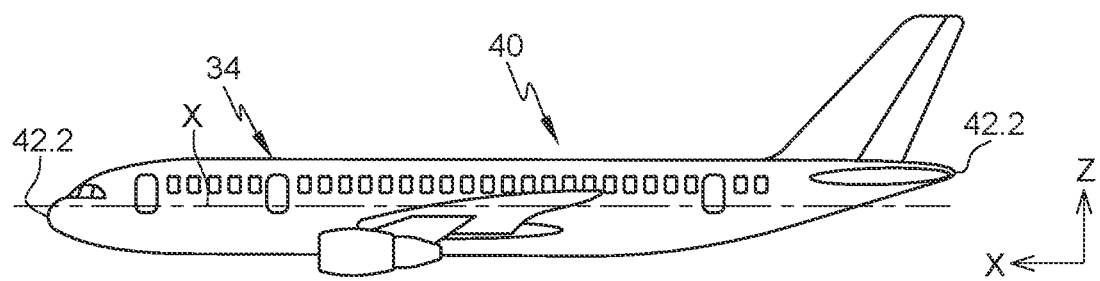
FIG. 3 is a lateral view of an aircraft.

As illustrated in FIG. 3, an aircraft 40 comprises a fuselage 42 which extends from a nosecone 42.1 to a tailcone 42.2.

For the remainder of the description, a longitudinal axis X of the aircraft 40 corresponds to the axis of rolling of the aircraft, which extends from the nosecone 42.1 to the tailcone 42.2 of the aircraft 40. A longitudinal direction is a direction parallel to the longitudinal axis X. A vertical longitudinal plane is a vertical plane passing through the longitudinal axis X. A transverse plane is a plane perpendicular to the longitudinal axis X.

Figure 6:
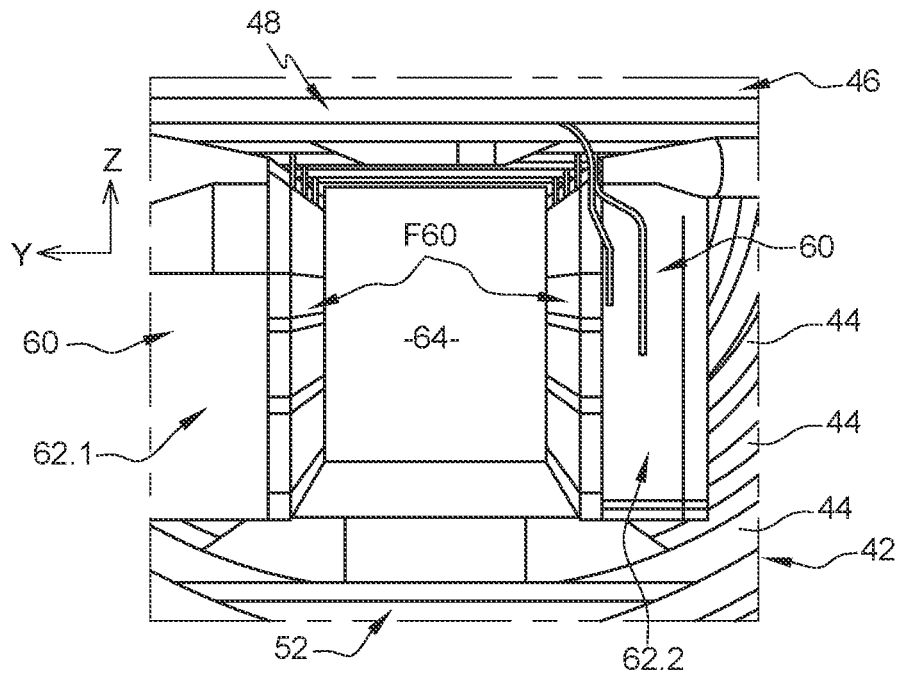
FIG. 6 is a view from the rear of an aircraft of an avionics bay illustrating one embodiment of the invention.

The fuselage 42 comprises a structure comprising transverse reinforcements also known as frames 44 (visible in FIG. 6), positioned in transverse planes, as well as longitudinal reinforcements, known as stringers, which are approximately parallel to the longitudinal axis X.

Figure 4:
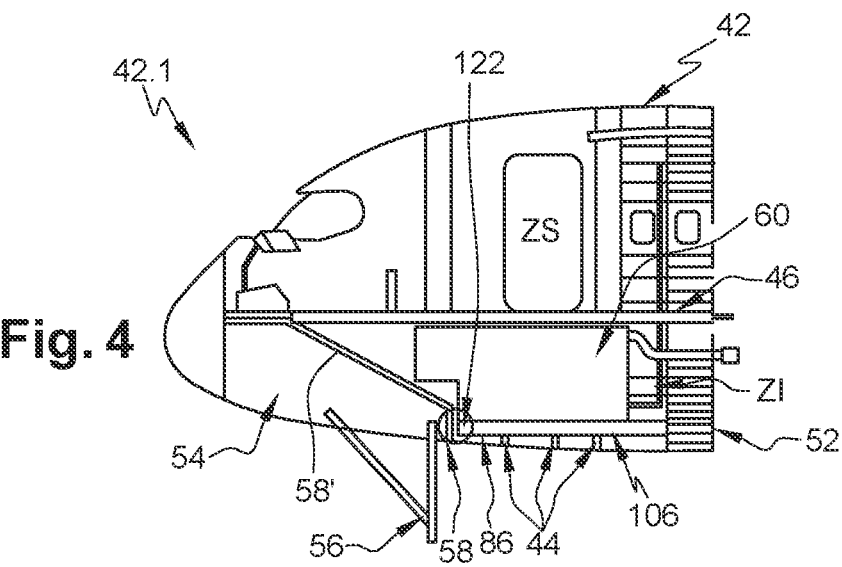
FIG. 4 is a longitudinal section through a front part of the aircraft visible in FIG. 3.

As illustrated in FIG. 4, the aircraft 40 comprises a substantially horizontal floor 46 that splits the interior of the fuselage 42 into an upper zone ZS and a lower zone ZI. In a configuration visible in FIGS. 7 and 14, the floor 46 comprises transverse beams 48 which are parallel to one another and positioned in transverse planes, as well as rails 50, which are parallel to one another and to the longitudinal axis X, positioned on the transverse beams 48 and connected thereto. Each rail 50 is a profile of I-shaped, J-shaped or some other shaped cross section. In general, the rails 50 are spaced from one another by a spacing smaller than that provided between the transverse beams 48. These rails 50 are notably used for securing the seats of the passenger cabin.

Figure 7:
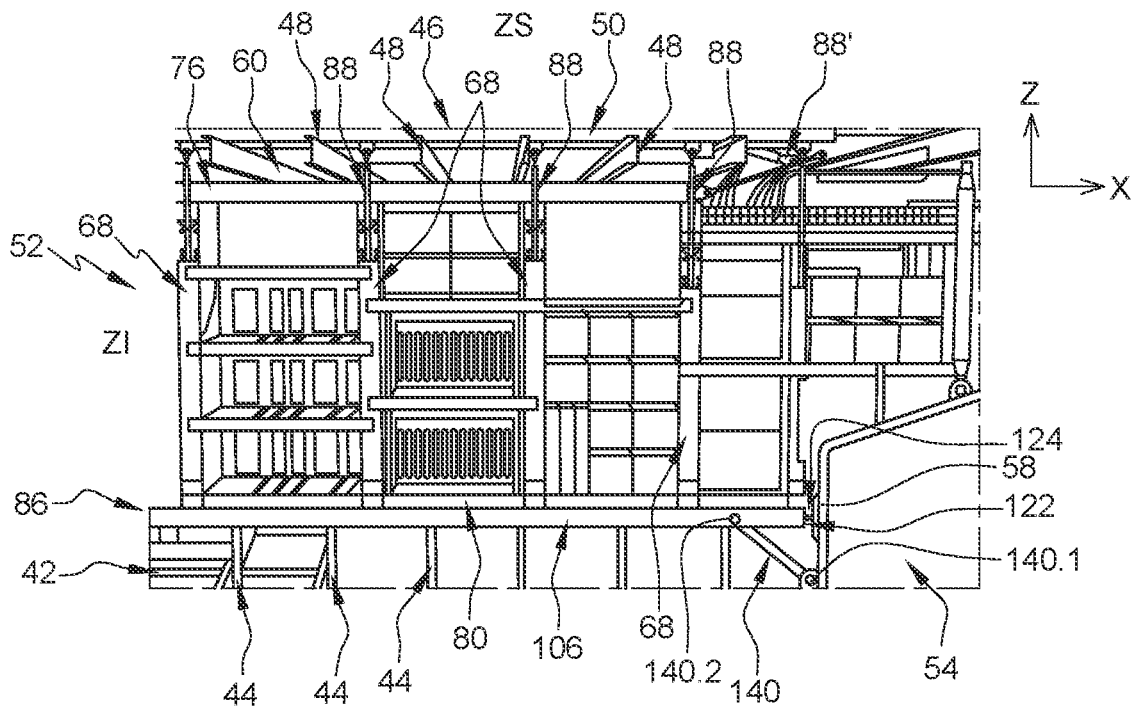
FIG. 7 is a lateral view of the avionics bay visible in FIG. 6.

As illustrated in FIGS. 4 and 7, the aircraft 40 comprises, in the lower zone ZI at the front of the aircraft, an avionics bay 52 as well as a landing gear compartment 54 which is positioned in front of the avionics bay 52. This landing gear compartment is configured to house a landing gear 56 that is able to move between a retracted position in which the landing gear 56 is positioned inside the landing gear compartment 54 and a down position in which the landing gear 56 is partially positioned outside the landing gear compartment 54.

The avionics bay 52 and the landing gear compartment 54 are separated by at least one wall 58. According to a configuration visible in FIG. 4, the avionics bay 52 and the landing gear compartment 54 are separated by a substantially vertical first transverse wall 58 and by an inclined second wall 58'. Whatever the embodiment, the avionics bay 52 and the landing gear compartment 54 are separated by a wall 58 which has a rear face F58 (visible in FIG. 13) facing toward the avionics bay 52.

According to one embodiment, this transverse wall 58 is reinforced so as to provide optimal reaction of forces in a transverse plane. In operation, the transverse wall 58 can deform in the longitudinal direction X notably as a result of the movements associated with the lowering and retraction of the landing gear 56.

The aircraft 32 comprises at least one systems cabinet 60 (also known as a rack) positioned in the avionics bay 52.

In one arrangement, the aircraft 32 comprises several systems cabinets 60 arranged in two rows 62.1, 62.2 which are oriented parallel to the longitudinal axis X on each side of the latter so as to delimit a passageway 64.

From a geometric standpoint, each systems cabinet 60, which is approximately parallelepipedal, has amongst other things a front face F60 and a rear face F60' substantially parallel to the front face F60. In the arrangement visible in FIG. 5, the front face F60 of the systems cabinets 60 is oriented toward the passageway 64. It is largely clear so as to allow access to the inside of the systems cabinet. The rear face F60' is oriented toward the fuselage 42. Each systems cabinet 60 has a first dimension referred to as the length (dimension measured in a horizontal plane in a first direction, parallel to the longitudinal axis X in this instance), a second dimension referred to as the width (dimension measured in a horizontal plane in a second direction perpendicular to the first direction and to the longitudinal axis X in this instance) shorter than the first dimension, and a third dimension referred to as the height (dimension measured in a vertical direction).

Each systems cabinet 60 comprises a lower platform 66, a first series of first vertical uprights 68 positioned at the front face F60 and a second series of second vertical uprights 70 (visible in FIG. 5) positioned at the rear face F60'. Each upright 68, 70 has a lower end connected to the lower platform 66, and an upper end.

Figure 5:
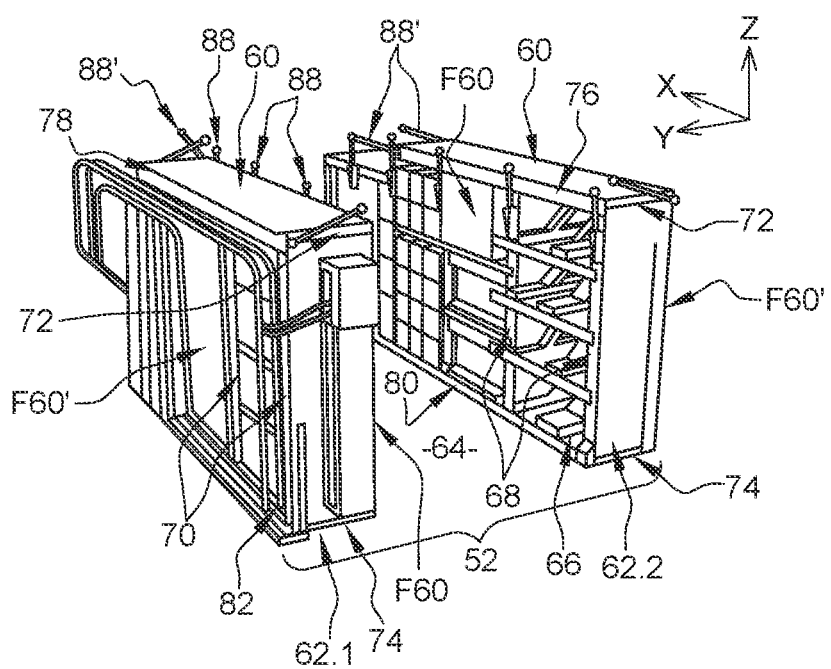
FIG. 5 is a perspective view of systems cabinets illustrating one embodiment of the invention.

In a configuration illustrated in FIG. 5, each systems cabinet 60 comprises upper crossmembers 72 connecting the upper end of each first upright 68 to the upper end of a second upright 70, lower crossmembers 74 connecting the lower end of each first upright 68 to the lower end of a second upright 70, at least a first upper longitudinal reinforcement 76 connecting the upper ends of the first uprights 68, at least a second upper longitudinal reinforcement 78 connecting the upper ends of the second uprights 70, at least a first lower longitudinal reinforcement 80 connecting the lower ends of the first uprights 68 and at least a second lower longitudinal reinforcement 82 connecting the lower ends of the second uprights 70. Thus, the systems cabinet 60 comprises several vertical frames positioned in transverse planes and each comprising a pair of first and second uprights 68, 70 which are connected by a pair of upper and lower crossmembers 72, 74, said transverse frames being connected by first and second upper and lower longitudinal reinforcements.

Figure 10:
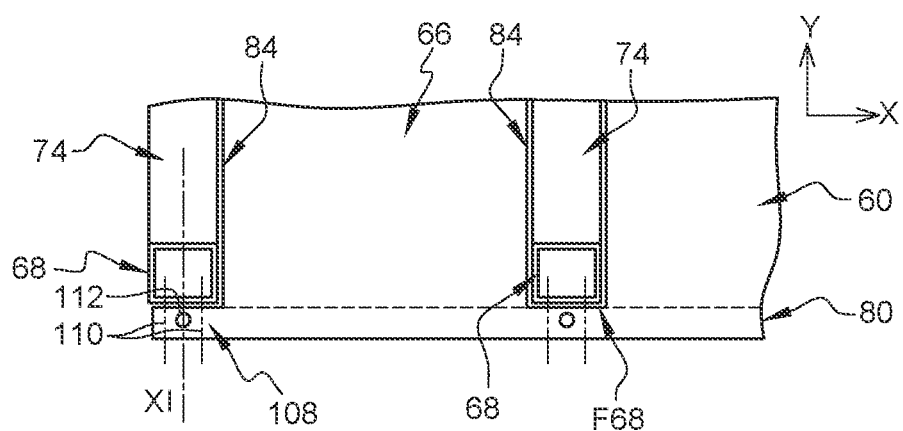
FIG. 10 is a view from above of part of a lower platform of a systems cabinet illustrating one embodiment of the invention.

The systems cabinet 60 may comprise intermediate crossmembers each connecting a first upright 68 and a second upright 70, and positioned between the upper and lower ends of the first and second uprights 68, 70, as well as intermediate longitudinal reinforcements connecting first or second uprights 68, 70 in pairs. According to a configuration visible in FIG. 10, the lower platform 66 of the systems cabinet 60 comprises, for each transverse frame, a cutout 84 in which the lower part of the transverse frame is positioned. With this configuration, the first and second lower longitudinal reinforcements 80, 82 are integrated into the lower platform 66 of the systems cabinet 60.

The systems cabinet 60 may comprise lateral faces and/or partitions connecting each of the first and second uprights 68, 70 positioned in the one same transverse plane, an upper face connecting the first and second upper longitudinal reinforcements 76, 78 and extending over the entire length of the systems cabinet 60, as well as shelves.

Each of the first and second uprights 68, 70 has a square or rectangular cross section. Each first upright 68 has a first face F68, the first faces F68 of the first uprights 68 of the systems cabinet 60 being substantially coplanar and forming the front face F60 of the systems cabinet.

Of course, the invention is not restricted to these embodiments for the systems cabinet 60. In general, the systems cabinet 60 comprises a series of first uprights 68 which are vertical and distributed in a direction parallel to the longitudinal axis X.

The aircraft comprises, for each systems cabinet 60, at least one lower connecting system 86 connecting, on the one hand, the systems cabinet 60 and, on the other hand, the structure of the fuselage 42 and/or the landing gear compartment 54, and at least one upper connecting system 88, 88' connecting the systems cabinet 60 and the floor 46.

In one configuration, the aircraft comprises first upper connecting systems 88 configured to react forces made up essentially of a vertical component and second upper connecting systems 88' configured to react forces made up essentially of at least a longitudinal component (parallel to the longitudinal axis X) and/or a transverse component (perpendicular to the longitudinal axis X).

According to one embodiment, at least a first upper connecting system 88 connects at least one of the first uprights 68 and a rail 50 of the floor 46.

In a first arrangement, all the first uprights 68 are connected by a first upper connecting system 88 to a rail 50 of the floor 46. In a second arrangement, at least a first upright 68 is connected by a first upper connecting system 88 to a rail 50 of the floor 46 and at least a first upright 68 is connected by another connecting system to a transverse beam 48 of the floor 46.

The rails 50 extend over at least the entire length of the systems cabinet 60, the first uprights 68 may be positioned irrespective of the positions of the transverse beams 48. This solution makes it possible to simplify the design of the systems cabinets 60 and standardize these.

The second upper connecting systems 88' may be connected to the first uprights 68. However, in a configuration visible in FIG. 5, they may be connected to one of the first and second upper longitudinal reinforcements 76, 78 or to any other part of the systems cabinet 60. These second upper connecting systems 88' may be connected indifferently to a rail 50 or to a transverse beam 48 of the floor 46.

Figure 14:
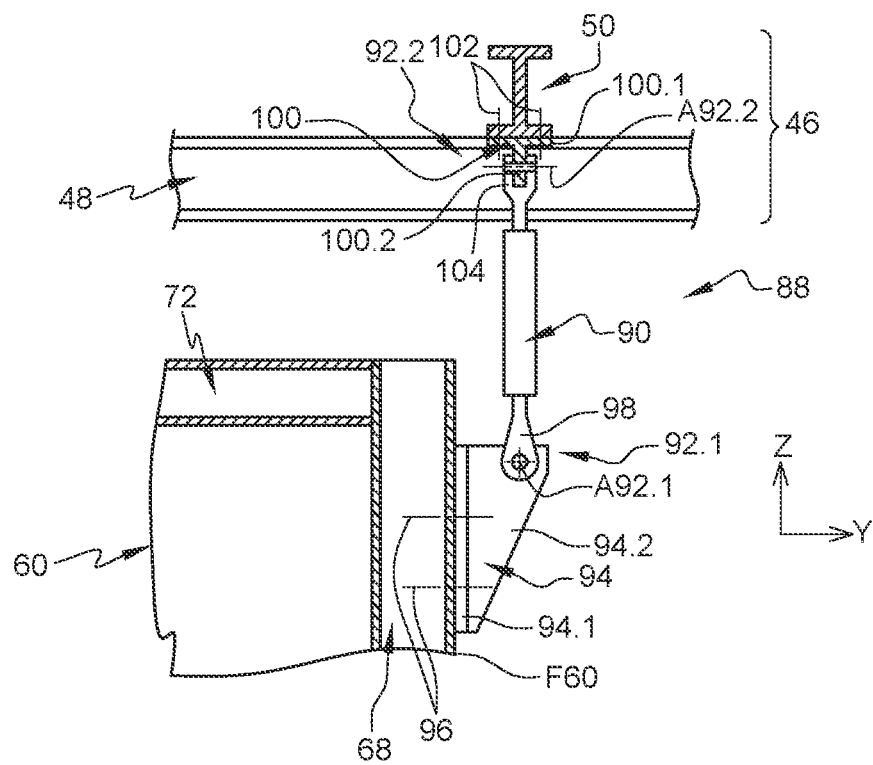
FIG. 14 is a face-on view of an upper connecting system illustrating one embodiment of the invention.

According to an embodiment visible in FIG. 14, each first upper connecting system 88 comprises a link 90 which has a first end connected by a first articulation 92.1 to the systems cabinet 60 and a second end connected by a second articulation 92.2 to the floor 46.

According to one embodiment, for each first upper connecting system 88, the first articulation 92.1 has a first axis of pivoting A92.1 oriented in a substantially horizontal first direction and the second articulation 92.2 has a second axis of pivoting A92.2 oriented in a substantially horizontal second direction perpendicular to the first direction. This solution makes it possible to prevent the links 90 of the first upper connecting systems 88 being loaded in the longitudinal and transverse directions.

In an arrangement illustrated in FIG. 14, the first axis of pivoting A92.1 of the first articulation 92.1 is approximately parallel to the longitudinal axis X and the second axis of pivoting A92.2 of the second articulation 92.2 is approximately perpendicular to the longitudinal axis X.

The first and/or second articulations 92.1, 92.2 may be ball-jointed.

According to one embodiment, the first articulation 92.1 comprises:

- a first bracket 94, secured to an upright 68, which has at least a first arm 94.1 pressed intimately against the first face F68 of the first upright 68 and connected to the latter by at least one fixing 96 and a second arm 94.2 positioned approximately in a transverse plane,
- a yoke 98, secured to the link 90, having two branches between which the second arm 94.2 of the first bracket 94 is positioned,
- a first pivot axis A92.1 passing through the second arm 94.2 and the branches of the yoke 98.

The second articulation 92.2 comprises:

- a second bracket 100, secured to the rail 50, and which has at least a first arm 100.1 pressed intimately against the rail 50 and connected to the latter by at least one fixing 102, as well as a second arm 100.2 positioned approximately in a longitudinal plane,
- a yoke 104, secured to the link 90, having two branches between which the second arm 100.2 of the second bracket 100 is positioned,
- a second pivot axis A92.2 passing through the second arm 100.2 and the branches of the yoke 104.

Of course, the invention is not restricted to these embodiments for the upper connecting systems 88, 88'.

At the rear face F60', the systems cabinet 60 may be connected directly to the frames 44 of the structure of the fuselage.

Figure 11:
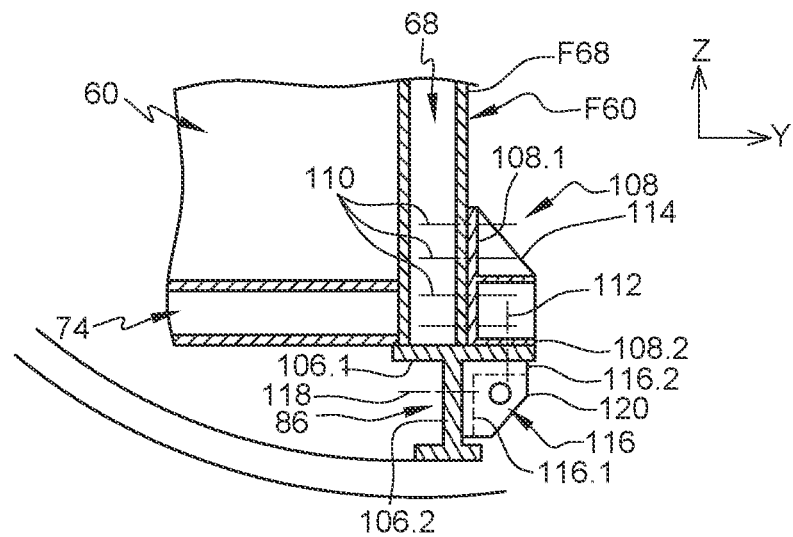
FIG. 11 is a section on XI-XI of FIG. 10.
Figure 12:
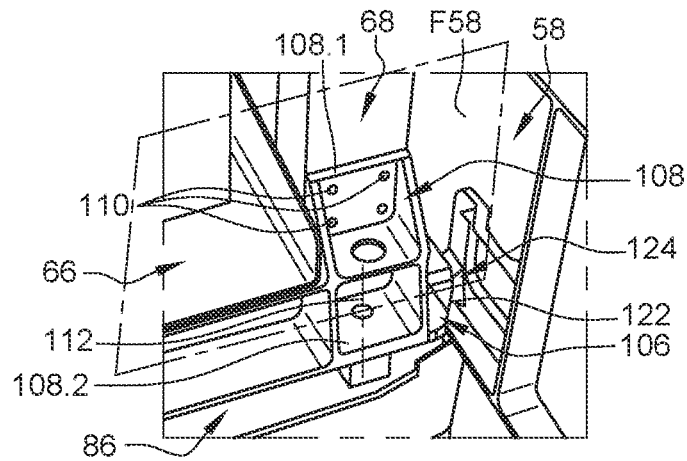
FIG. 12 is a perspective view of part of a lower connecting system connected to a wall of a landing gear compartment illustrating one embodiment of the invention.

According to one feature of the invention visible in FIG. 11, the systems cabinet 60 being spaced away from the frames 44 of the structure of the fuselage plumb with the front face F60 thereof, a lower connecting system 86 comprises at least one longitudinal beam 106 (parallel to the longitudinal axis X) which is connected to the frames 44 and positioned approximately plumb with the first uprights 68 of the systems cabinet 60. In one configuration, the longitudinal beam 106 has an upper flange 106.1 on which the systems cabinet 60, notably the first uprights 68 thereof, rests, as well as a web 106.2 substantially perpendicular to the upper flange 106.1.

In one embodiment, the lower connecting system 86 comprises, for each first upright 68, a first bracket 108 (visible in FIGS. 8 to 11). This first bracket 108 comprises a first arm 108.1 pressed intimately against the first face F68 of the first upright 68 and connected to the latter by at least one fixing 110, as well as a second arm 108.2 pressed intimately against the upper flange 106.1 of the longitudinal beam 106 and connected thereto by at least one fixing 112. To improve its mechanical characteristics, the first bracket 108 has at least one gusset 114, notably an array of gussets.

To improve the transmission of load between each first upright 68 and the longitudinal beam 106, the lower connecting system 86 comprises, in line with at least one first upright 68, a second bracket 116, positioned in line with the first bracket 108, which has a first arm 116.1 pressed intimately against the web 106.2 of the longitudinal beam 106 and connected to the latter by at least one fixing 118, and a second arm 116.2 pressed intimately against the upper flange 106.1 of the longitudinal beam 106, more particularly against the underside face thereof, and connected to the latter by at least one fixing. In one arrangement, the second arms 108.2, 116.2 of the first and second brackets 108, 116 and the upper flange 106.1 of the longitudinal beam 106 are connected using the same fixings 112.

To improve its mechanical characteristics, this second bracket 116 has at least one gusset 120 connecting the first and second arms 116.1, 116.2.

Figure 8:
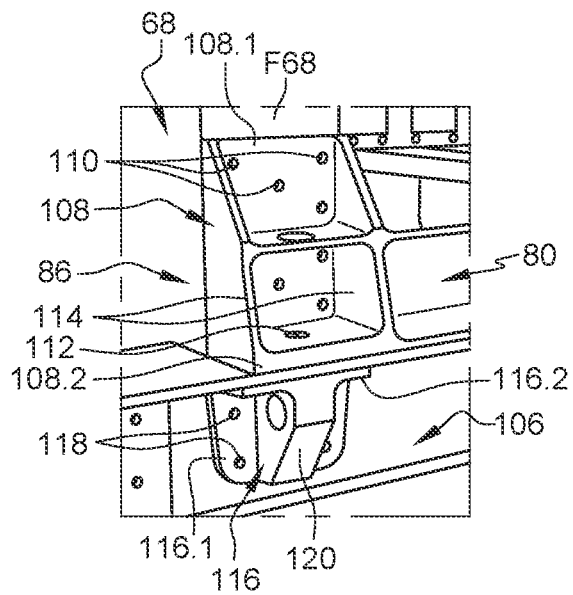
FIG. 8 is a perspective view of a lower connecting system illustrating a first embodiment of the invention.
Figure 9:
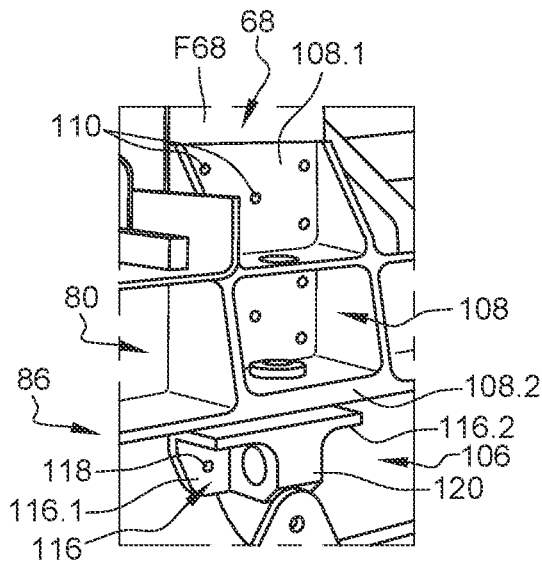
FIG. 9 is a perspective view of a lower connecting system illustrating a second embodiment of the invention.

According to embodiments visible in FIGS. 8 and 9, the first brackets 108 connecting the first uprights 68 of the systems cabinet 60 to the structure of the fuselage 42 are secured to the first lower longitudinal reinforcement 80. In one configuration, the first lower longitudinal reinforcement 80 and the first brackets 108 form the one same single component. The first lower longitudinal reinforcement 80, the first brackets 108 and the lower platform 66 of the systems cabinet 60 may form the one same single component. In an embodiment visible in FIG. 8, a first bracket 108, integrated into the first lower longitudinal reinforcement 80, connects a first upright 68 situated at one end of the systems cabinet 60 and the longitudinal beam 106. In an embodiment visible in FIG. 9, a second bracket 108, integrated into the first lower longitudinal reinforcement 80, connects a second upright 68 distant from an end of the systems cabinet 60, and the longitudinal beam 106.

The lower connecting system 86 is not restricted to these embodiments. Thus, the longitudinal beam 106 could be integrated into the systems cabinet 60. By way of example, at least one of the longitudinal reinforcements that are the first lower longitudinal reinforcement 80 and the second lower longitudinal reinforcement 82 may act as a longitudinal beam 106.

Whatever the embodiment, the systems cabinet 60 and/or the lower connecting system 86 comprises at least one longitudinal beam 106, oriented parallel to the longitudinal direction X, which has a front end 122 oriented toward the landing gear compartment 54 and connected by a front connection 124 to the wall 58 separating the avionics bay 52 from the landing gear compartment 54.

The longitudinal beam 106 transmits load between the systems cabinet 60 and the structure of the fuselage 42 and makes it possible to achieve uncoupling between the systems cabinet 60 and the structure of the fuselage 42. Thus, the first and/or second uprights 68 of the systems cabinet 60 are no longer positioned according to the position of the frames 44 of the fuselage 42. As a result, the systems cabinet 60 can be standardized and no longer needs to be designed according to the aircraft in which it is installed.

Connecting the longitudinal beam 106 to the wall 58 of the landing gear compartment 54 means that it is possible to extend the systems cabinet forward, over the landing gear compartment 54, ultimately making it possible to reduce the length of the avionics bay 52.

In a first configuration, the longitudinal beam 106 is integrated into the systems cabinet 60. In a second configuration, the longitudinal beam 106 is distinct from the systems cabinet 60, the latter resting on the longitudinal beam 106. In a first arrangement, the longitudinal beam 106 is positioned plumb with the first uprights 68. In other arrangements, the longitudinal beam 106 is offset toward the rear face F60' of the systems cabinet 60 relative to the first uprights 68.

The longitudinal beam 106 is connected to the structure of the fuselage 42, more particularly to at least one frame 44 of the fuselage, either directly or indirectly via at least one intermediary component such as a bracket for example, using connecting elements such as bolts or rivets for example.

The longitudinal beam 106 extends over at least part of the length of the systems cabinet 60. In one arrangement, the longitudinal beam 106 extends over the entire length of the systems cabinet 60.

According to one particular feature of the invention, the front connection 124 comprises a sliding connection sliding in a direction parallel to the longitudinal axis X. In one configuration, the front connection 124 comprises a connection of the sliding pivot type which has an axis of rotation parallel to the longitudinal axis X. Thus, the front connection 124 is able to react forces in a transverse plane and allows longitudinal translational movements (parallel to the longitudinal direction X) between the systems cabinet 60 and the wall 58 separating the avionics bay 52 from the landing gear compartment 54. Thus, the deformations of the wall 58 in the longitudinal direction X do not impact the systems cabinet 60.

In one configuration, the front connection 124 is ball-jointed. Thus, the front connection 124 allows rotational movements about three orthonormal axes between the systems cabinet 60 and the wall 58 separating the avionics bay 52 from the landing gear compartment 54.

In one embodiment, the front connection 124 comprises a longitudinal rod 126, oriented parallel to the longitudinal axis X, having a first end 126.1 connected to a first element of either the wall 58 or the longitudinal beam 106, and a housing 128 configured to house the longitudinal rod 126 and positioned on a second element, different than the first element, of either the longitudinal beam 106 or the wall 58.

In one configuration, the front connection 124 comprises at least a first ring 130, positioned in the housing 128, having a cylindrical interior surface of inside diameter substantially equal to the outside diameter of the longitudinal rod 126, interposed between the second element and the longitudinal rod 126.

Figure 13:
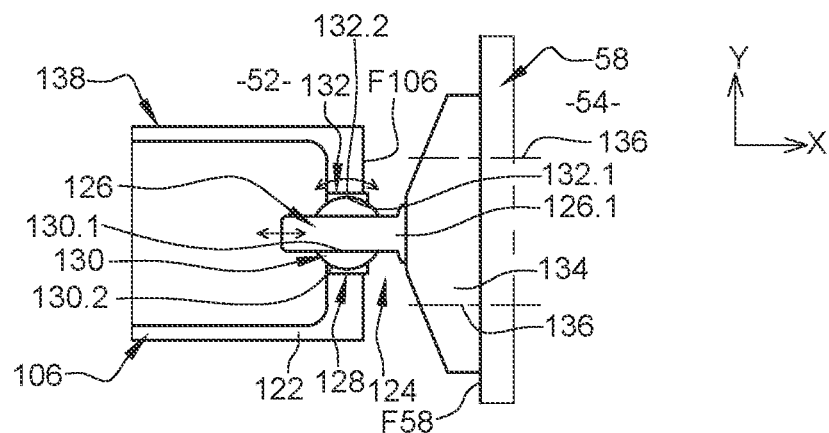
FIG. 13 is a longitudinal section on the plane P of FIG. 12 of the connecting system visible in FIG. 12.

In another configuration visible in FIG. 13, the front connection 124 comprises:
- a first ring 130 having an interior surface 130.1 of inside diameter substantially equal to the outside diameter of the longitudinal rod 126, so as to obtain a sliding connection between the longitudinal rod 126 and the first ring 130, and a substantially spherical exterior surface 130.2,
- a second ring 132, positioned around the first ring 130, having a substantially spherical interior surface 132.1 matched to the exterior surface 130.2 of the first ring 130 so as to form a ball-jointed connection, and an exterior surface 132.2 that is built into the housing 128.

In one arrangement, the longitudinal rod 126 is connected to the wall 58, directly or indirectly, by fixings or fixing elements 136 of which may be a bolt or rivet for example. In addition, the housing 128 is provided on the longitudinal beam 106.

In an embodiment visible in FIG. 13, the front connection 124 comprises a mount 134 fixed by fixing elements 136 to the rear face F58 of the transverse wall 58 of the landing gear compartment 54, the first end 126.1 of the longitudinal rod 126 being secured to said mount 134. In this embodiment, the longitudinal beam 106 is hollow and comprises, at its front end 122, a transverse wall F106 that has a through-hole forming the housing 128.

In another embodiment, the longitudinal beam 106 comprises an upper flange 106.1 and a web 106.2. To complement this, the front connection 124 comprises a hollow segment 138 of square or rectangular cross section, said hollow segment 138 being connected to the upper flange 106.1 and to the web 106.2 of the longitudinal beam 106 by connecting elements such as bolts or rivets for example, and comprising a transverse wall F106 which has a through-hole forming the housing 128.

In an embodiment visible in FIG. 7, the lower connection 86 comprises at least one link 140, positioned in a vertical plane parallel to the longitudinal axis X, which has a first end 140.1 connected by a first articulation to the longitudinal beam 106 and/or to the systems cabinet 60, and a second end 140.2 connected by a second articulation to the structure of the fuselage 42 and/or to a junction zone connecting the structure of the fuselage 42 and the wall 58 of the landing gear compartment 54. In one configuration, each of the first and second articulations has at least one axis of pivoting parallel to a horizontal direction and perpendicular to the longitudinal axis X.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a fuselage which has a longitudinal axis and a structure,
a floor demarcating an upper zone above the floor and a lower zone beneath the floor,
an avionics bay situated in the lower zone,
a landing gear compartment situated in the lower zone, in front of the avionics bay, and separated from the avionics bay by at least one wall,
at least one systems cabinet positioned in the avionics bay, and,
at least one lower connecting system connecting the systems cabinet and the structure of the fuselage,
wherein the systems cabinet, or the at least one lower connecting system, or both, comprises at least one longitudinal beam, oriented parallel to the longitudinal axis, which has a front end oriented toward the landing gear compartment and connected by a front connection to the at least one wall separating the avionics bay and the landing gear compartment,
wherein the front connection comprises a sliding connection sliding in a direction substantially parallel to the longitudinal axis.

2. The aircraft as claimed in claim 1, wherein the front connection further comprises a longitudinal rod, oriented parallel to the longitudinal axis, having a first end connected to one of the at least one wall or the longitudinal beam and a housing configured to house the longitudinal rod and positioned on the other of the longitudinal beam or the at least one wall.

3. The aircraft as claimed in claim 2, wherein the front connection comprises a ball-joint.

4. The aircraft as claimed in claim 3, wherein the front connection further comprises:
- a first ring having an interior surface of inside diameter substantially equal to an outside diameter of the longitudinal rod so as to form the sliding connection between the longitudinal rod and the first ring and a substantially spherical exterior surface, and,
- a second ring, positioned around the first ring, having a substantially spherical interior surface matched to the spherical exterior surface of the first ring so as to form the ball-joint and an exterior surface that is built into the housing.

5. The aircraft as claimed in claim 2, wherein the longitudinal rod is connected to the at least one wall.

6. The aircraft as claimed in claim 2, wherein the longitudinal beam is hollow and comprises, at the front end, a transverse wall which has a through-hole forming the housing.

7. The aircraft as claimed in claim 2, wherein the front connection comprises a hollow segment with a square or rectangular cross section, said hollow segment being connected to the longitudinal beam and comprising a transverse wall which has a through-hole forming the housing.

8. The aircraft as claimed in claim 1, wherein the systems cabinet comprises a front face and a plurality of first vertical uprights each comprising a first face positioned at the front face, the longitudinal beam being positioned plumb with the first vertical uprights and connected to the structure of the fuselage.

9. The aircraft as claimed in claim 8, wherein the longitudinal beam has an upper flange on which the systems cabinet rests, and a web substantially perpendicular to the upper flange, and wherein the at least one lower connecting system comprises, for each first vertical upright, a first bracket having a first arm pressed intimately against the first face of the first longitudinal beam upright and connected to said first longitudinal beam upright by at least one fixing element and a second arm pressed intimately against the upper flange of the longitudinal beam and connected to said upper flange by at least one fixing element.

10. The aircraft as claimed in claim 9, wherein the at least one lower connecting system further comprises, in line with at least one first vertical upright, a second bracket, positioned in line with the first bracket, having a first arm pressed intimately against the web of the longitudinal beam and connected to the web by at least one fixing element and a second arm pressed intimately against the upper flange of the longitudinal beam and connected to this upper flange by at least one fixing element.

11. The aircraft as claimed in claim 10, wherein the second arms of the first and second brackets and the upper flange of the longitudinal beam are connected using the same fixing elements.

12. The aircraft as claimed in claim 1, wherein the at least one lower connecting system comprises at least one link, positioned in a vertical plane parallel to the longitudinal axis, which has a first end connected to the longitudinal beam or to the systems cabinet or to both, and a second end connected to the structure of the fuselage or to a junction zone connecting the structure of the fuselage and the at least one wall of the landing gear compartment or to both.

* * * * *